United States Patent Office 3,346,421
Patented Oct. 10, 1967

3,346,421
TRANSITION METAL ELECTRODE
Charles E. Thompson, Fanwood, and Carl E. Heath, Jr., Berkeley Heights, N.J., assignors to Esso Research and Engineering Company, a corporation of Delaware
No Drawing. Filed Dec. 30, 1963, Ser. No. 334,576
19 Claims. (Cl. 136—120)

This invention relates to improvements in electrodes for use in electrochemical cells and, in particular, to those cells designed for the production of electrical energy by the electrochemical oxidation of a fluid combustible fuel. More particularly, this invention relates to electrodes made from transition metals. Most particularly, this invention relates to electrodes made from compounds of metals of Groups IV–B, V–B and VI–B of the Periodic Chart in combination with metals or alloys of metals from Groups VII–B, VIII and I–B of the Periodic Chart of the elements.

Heretofore, electrodes for use in electrochemical cells and/or fuel cells had been electrodes such as porous carbon bodies, metal wire screens, metal coated membranes, sintered metal powders which had been pressed into shape and metal coated nonelectroconductive metal screens.

The sintered shaped metal bodies were usually made by taking one or more finely divided metal powders, mixing them with a binder so that the powder could be shaped and then heating the shaped body to high temperatures so as to vaporize the binder and fuse and sinter the metal particles. This required heating the shaped bodies to high temperatures of about 1800° F.

It has now been found that efficient electrodes can be made by mixing catalytic particles comprising a combination of compounds of Groups IV–B, V–B and VI–B of the Periodic Chart with metals or alloys of metals of Groups VII–B, VIII and I–B of the Periodic Chart with a binder material and a filler material. The binder material will act so as to extend the catalyst and impart desirable properties to electrodes such as rendering electrodes more or less hydrophobic, increasing mechanical stability of electrodes and reducing the cost of the electrode. Reduction in cost is readily apparent when electrodes of this invention are compared with electrodes of the prior art which comprise a noble metal screen with a catalyst thereon such as platinum black. The filler material which is used in this invention will allow for the control of porosity of the electrodes. The electrodes prepared by this invention are extremely useful in systems wherein the fuel and oxidant would poison the opposing electrodes.

Heretofore in systems of this kind, membranes have been used to prevent the fuel from contacting the cathode and the oxidant from contacting the anode. It has now been found that when using an electrode prepared in accordance with the instant invention, it is not necessary to utilize a membrane in order to prevent the fuel from contacting the cathode or the oxidant from contacting the anode. The electrode of this invention can be used to prevent the migration of fuel by utilizing the electrode between the fuel compartment and the electrolyte compartment. The hydrophobic nature of the instant electrodes will prevent the aqueous electrolyte from flooding the pores of the electrode.

The binding material of this invention can be any high molecular weight material that is stable at the conditions at which the filler material is removed and under operating conditions of the electrolytic cell. Suitable materials are halogenated hydrocarbon polymers such as tetrafluoroethylene polymer, hexafluoropropylene polymer, fluoroethylene-propylene polymer, chlorotrifluoroethylene polymer, polyvinylidene fluoride polymer and chlorinated ether polymers.

The catalyst material can consist of any of the Group VIII metals, alloys of the Group VIII metals, oxides of the Group VIII metals, mixtures and alloys of Groups VIII, VII–B and I–B metals. Examples of some of the catalysts which are suitable for use include catalysts such as platinum; platinum and gold; platinum and rhenium; platinum and iridium; platinum, gold and iron; platinum with rhenium heptoxide; platinum with molybdenum and platinum with ruthenium.

The filler materials can be any particulate material that can completely decompose to gaseous products upon heating or may be leached out by means of a chemical composition that does not affect the binder or catalyst. The particulate filler material of necessity must either sublime or vaporize at a temperature at which the binder and catalyst material are stable. Materials which are suitable for use as filler materials include polyethylene, polypropylene, ammonium oxalate and ammonium carbonate. The choice of particle size of the filler is determined by the size pores desired in the electrode in that the size of the pores of electrode will be substantially the same size as the particle of the filler material.

The electrodes of this invention which are electrically conductive and very resistant to strongly corrosive electrolytes are prepared by impregnating a base material with the catalyst, then intimately mixing the base material with the binder and filler materials then pressing the mixture into a rigid structure and then slowly heating the pressed structure up to the decomposition temperature of the filler. It is necessary that the pressed structure be heated from a temperature substantially below the temperature at which the filler will be decomposed and then gradually raising this temperature to a decomposition temperature of the filler material. During this process of gradually increasing the temperature, the filler particles at the surface of the structure decompose first leaving cavities. Then the filler particles are decomposed sequentially from the surface inwardly to the center of the structure as the body heats from the surface to the center. The gaseous products escape from the interior of the structure through the cavities left by the particles that were closer to the surface. This process of gradually increasing the temperature to remove the filler material produces a porous structure comprising essentially binder and catalyst impregnated substrate for use as an electrode. Such electrodes may be used either as the anode or cathode in a cell; an anode being an electrode whereas the fuel is oxidized and the cathode is the electrode whereas the oxidant is reduced.

The base materials for use in this invention are the silicides of Groups IV–B, V–B and VI–B of the Periodic Chart and the nitrides of titanium, vanadium, noibium, tantalum and chromium and the carbides of tungsten and vanadium. Specific examples of these base materials would include $TiSi_2$, $ZrSi_2$, $NbSi_2$, $TaSi_2$, $CrSi_2$, $MoSi_2$, $WSi_2$, $Cr_3Si$, $Cr_2Si$, $TiN$, $VN$, $NbN$, $Ta_2N$, $CrN$, $Cr_2N$, $WC$ and $VC$. In the practice of this invention, the foregoing base materials are impregnated with a catalyst by soaking the base material in a solution of the catalyst salts or the acid form of the catalyst. Drying the structure and then either immersing the base material in a reducing solution such as sodium borohydride and then drying and washing or treating the base material under carbon monoxide at about 800° F. for 3 or 4 hours and then treating with hydrogen at 1600° F. for 3 hours or treating the base material with hydrogen at about 600° F. for 3 hours. These procedures provide for catalytically impregnating the base materials. Base materials are generally impregnated with catalysts to an extent of 1 to 5 wt. percent of catalyst based on the weight of the substrate.

The percent composition of the materials for the production of the electrode is such that the ratio of base to binder would be in the range of 5 to 1 and the ratio of base to filler would be in the range of 5 to 2. The pressure at which the electrode is pressed can vary from about 3,000 to 20,000 p.s.i.g., preferably be in the range of 5,000 to 15,000 p.s.i.g. The pressure at which the electrodes are pressed would normally depend upon the amount of filler material present in that as the amount of filler is increased, the pressure can be decreased.

The electrodes of this invention are designed for fuel cells employing acid electrolytes such as sulfuric, phosphoric and perchloric acids, both aqueous and concentrated. The electrodes will function at any temperature at which the binder would be stable. These electrodes will readily function with any of the known fuels such as hydrogen hydrocarbons, both gaseous and liquid, oxygenated hydrocarbons such as alcohols, ketones and ethers and will function as a cathode when using oxygen or oxygen-containing gases as the oxidant.

This invention is more fully illustrated by the following examples which are illustrative only and should not be construed as limitations upon the true scope of the invention as set forth in the appended claims.

*Example 1*

An electrode was prepared in accordance with this invention by impregnating 25 grams of WC with a catalyst by contacting the WC with a solution containing 0.75 gram of chloropatinic acid in 2.5 mls. of water. After the WC has imbibed the solution it was dried at 230° F. Then it was added to a solution comprised of 2 grams of sodium borohydride and 100 mls. of water. It was heated to 70° C. for 30 minutes, removed from the solution or reducing agent and washed and then dried at 230° F. Two grams of the impregnated WC was then mixed with 1 gram of tetrafluoroethylene and 1 gram of ammonium oxalate and mixed in a ball mill for 20 minutes. The mixture was then pressed into a thin sheet at 10,000 p.s.i.g. The mixture was then removed and then gradually heated up to a temperature of between about 380 and 390° F. for 1 hour. This caused the filler material to be decomposed and escape as a gas leaving a porous body. This electrode was then tested in the anode half cell and found to function efficiently as an anode. It was also tried as a cathode and found to function efficiently with air as the oxidant.

*Example 2*

Twenty-five grams of WC was impregnated with the solution comprising 0.75 gram of chloroplatinic acid and 2.5 mls. of water. The WC was then dried at 230° F. The dried WC was then treated with carbon monoxide at 800° F. for 3 hours and then subjected to a treatment in hydrogen at 1600° F. for 3 hours. Five grams of the WC was then mixed with 0.5 gram tetrafluoroethylene and 1 gram of ammonium oxalate and pressed at 15,000 p.s.i.g. The shaped body was then heated slowly to about 385° F. for one hour. This caused the ammonium oxalate to decompose leaving a porous structure. This structure was tested and found to be efficient as an electrode in a fuel cell.

*Example 3*

Twenty-five grams of titanium nitride and 1.9 grams of chloroplatinic acid in 3.5 mls. of water were mixed together. The nitride was then dried at about 240° F. and then treated in hydrogen atmosphere at 1600° F. for 3½ hours. The titanium nitride was then mixed with tetrafluoroethylene and ammonium oxalate, pressed at 12,000 p.s.i.g. and then slowly heated to 385° F. which was maintained for 1 hour. The resultant product was a porous body that functioned efficiently as an electrode in a fuel cell.

*Example 4*

A number of electrodes were prepared in accordance with this invention and tested both as the anode and cathode in a fuel cell. The electrodes were prepared in order to test the various bases for use in making the electrodes. All the electrodes prepared functioned as electrodes in a fuel cell. Electrodes prepared had the following composition: (a) 50 wt. percent $Cr_3Si$ having 3% platinum catalyst thereon, 25 wt. percent tetrafluoroethylene as a binder and 25 wt. percent ammonium oxalate as a filler; (b) 75 wt. percent $MoSi_2$ impregnated with 1% platinum gold catalyst, 10 wt. percent tetrafluoroethylene as the binder and 15 wt. percent of ammonium oxalate as the filler; (c) 60 wt. percent VC as the base with 3 wt. percent platinum-iridium catalyst thereon, 20 wt. percent tetrafluoroethylene as the binder and 20 wt. percent ammonium carbonate as the filler; (d) 75 wt. percent NbN with 1.2% platinum as the catalyst, 10 wt. percent tetrafluoroethylene as the binder and 15 wt. percent ammonium oxalate as the filler; (e) 75 wt. percent $Cr_2N$ with 2.5 wt. percent platinum-iridium catalyst thereon, 10 wt. percent tetrafluoroethylene as the binder and 15 wt. percent ammonium oxalate as the filler; (f) 70 wt. percent $VSi_2$ with 2.7 wt. percent platinum-gold thereon as the catalyst, 10 wt. percent tetrafluoroethylene as the binder and 20 wt. percent ammonium oxalate as the filler; (g) 70 wt. percent $Cr_3Si$ impregnated with 3 wt. percent platinum as the catalyst, 10 wt. percent tetrafluoroethylene as a binder and 20 wt. percent ammonium carbonate as the filler; (h) 80 wt. percent $NbSi_2$ impregnated with 3 wt. percent platinum-iridium catalyst, 8 wt. percent hexafluoropropylene polymer as the binder and 12 wt. percent ammonium oxalate as the filler; (i) 75 wt. percent $TaSi_2$ with 1.5 wt. percent platinum catalyst thereon, 10 wt. percent fluoroethylene-propylene polymer as the binder and 15 wt. percent ammonium oxalate as the filler; (j) 60 wt. percent VN with 3 wt. percent platinum-iridium catalyst thereon, 20 wt. percent chlorotrifluoroethylene polymer as the binder and 20 wt. percent ammonium oxalate as the filler; (k) 75 wt. percent $Ta_2N$ with 1.2 wt. percent platinum catalyst thereon, 10 wt. percent tetrafluoroethylene polymer as the binder and 15 wt. percent ammonium carbonate as the filler; (l) 75 wt. percent $ZrSi_2$ impregnated with 2.5 wt. percent platinum-iridium catalyst thereon, 10 wt. percent hexafluoropropylene polymer as the binder and 15 wt. percent polyethylene as the filler; (m) 70 wt. percent $WSi_2$ with 2.7 wt. percent platinum-rhenium catalyst thereon, 10 wt. percent fluoroethylene-propylene copolymer as the binder and 20 wt. percent polypropylene as the filler; (n) 70 wt. percent $Cr_2Si$ with 3 wt. percent platinum catalyst thereon, 10 wt. percent chlorotrifluoroethylene polymer as the binder and 20 wt. percent polyethylene as the filler.

Each of the electrodes (a) through (n) was pressed at pressures of about 9,000 p.s.i.g. to 15,000 p.s.i.g. and then heated gradually up to the decomposition temperature of the filler material. In each of the cases (a) through (n) there resulted a porous electrode comprising essentially catalyst and binder material. These electrodes were tested on fuels such as hydrogen, ethane, propane, and methanol and found to perform as the anode in a fuel cell. Electrodes were further tested with air and oxygen and found to perform as cathodes in a fuel cell.

What is claimed is:

1. A porous electrode comprising an intimate mixture of a halogenated hydrocarbon polymer and a compound selected from the group consisting of Groups IV–B, V–B, VI–B silicide, tungsten carbide, vanadium carbide, titanium nitride, vanadium nitride, niobium nitride, tantalum nitride and chromium nitride, said compound being impregnated with 1 to 3 wt. percent catalyst.

2. A porous electrode comprising an intimate mixture of tetrafluoroethylene polymer and titanium nitride, said titanium nitride having been impregnated with 1 to 3 wt. percent catalyst.

3. A porous electrode comprising an intimate mixture of tetrafluoroethylene polymer and niobium silicide which has been impregnated with 1 to 3 wt. percent of catalyst.

4. A porous electrode comprising an intimate mixture of a halogenated hydrocarbon and tungsten carbide, said tungsten carbide having been impregnated with 1 to 3 wt. percent of catalyst.

5. A porous electrode comprising an intimate mixture of a halogenated hydrocarbon ploymer and vanadium nitride wherein said vanadium nitride had been impregnated with 1 to 3 wt. percent of catalyst.

6. A porous electrode comprising an intimate mixture of a halogenated hydrocarbon polymer and zirconium silicide which had been impregnated with 1 to 3 wt percent platinum.

7. A porous electrode comprising an intimate mixture of tetrafluoroethylene and vanadium carbide which had been impregnated with 3 wt. percent platinum catalyst.

8. A porous electrode comprising an intimate mixture of a halogenated hydrocarbon polymer and niobium nitride which had been impregnated with 1 to 3 wt. percent of a catalyst.

9. A porous electrode comprising an intimate mixture of a halogenated hydrocarbon polymer and tungsten silicide which had been impregnated with 1 to 3 wt. percent of a catalyst.

10. A porous electrode comprising an intimate mixture of a halogenated hydrocarbon polymer and $Ta_2N$ which had been impregnated with 1 to 3 wt. percent of catalyst.

11. A porous electrode comprising an intimate mixture of a halogenated hydrocarbon polymer and titanium silicide which had been impregnated with 1 to 3 wt. percent of catalyst.

12. A porous electrode comprising an intimate mixture of a halogenated hydrocarbon polymer and a chromium nitride which had been impregnated with 1 to 3 wt. percent of a catalyst.

13. A porous electrode comprising an intimate mixture of a halogenated hydrocarbon polymer and tantalum silicide which had been impregnated with 1 to 3 wt. percent of a catalyst.

14. A porous electrode comprising an intimate mixture of a halogenated hydrocarbon polymer and chromium silicide which had been impregnated with 1 to 3 wt. percent of a catalyst.

15. A porous electrode comprising an intimate mixture of tetrafluoroethylene and tungsten carbide, wherein said tungsten carbide had been impregnated with 3 wt. percent platinum as the catalyst, and the ratio of tungsten carbide to tetrafluoroethylene is 2:1.

16. A porous electrode comprising an intimate mixture of tetrafluoroethylene polymer and tungsten carbide, wherein said tungsten carbide having been impregnated with 3 wt. percent platinum as the catalyst and the ratio of tungsten carbide to tetrafluoroethylene is 10:1.

17. A porous electrode comprising an intimate mixture of tetrafluoroethylene polymer and titanium nitride wherein said titanium nitride had been impregnated with 3 wt. percent platinum catalyst and the ratio of titanium nitride to tetrafluoroethylene is 10:1.

18. In a fuel cell utilizing a liquid electrolyte with anode and cathode electrodes for the production of electricity by the electrochemical oxidation of a fluid combustible fuel, the improvement wherein each of said anode and cathode electrodes comprises an intimate mixture of a halogenated hydrocarbon polymer and a compound selected from the group consisting of Groups IV–B, V–B, VI–B silicide, tungsten carbide, vanadium carbide, titanium nitride, vanadium nitride, niobium nitride, tantalum nitride and chromium nitride, said compound being impregnated with 1 to 3 wt. percent catalyst.

19. In a fuel cell utilizing a liquid electrolyte with anode and cathode electrodes for the production of electricity by the electrochemical oxidation of a fluid combustible fuel, the improvement wherein at least one of said electrodes comprises an intimate mixture of a halogenated hydrocarbon polymer and a compound selected from the group consisting of Groups IV–B, V–B, VI–B silicide, tungsten carbide, vanadium carbide, titanium nitride, vanadium nitride, niobium nitride, tantalum nitride and chromium nitride, said compound being impregnated with 1 to 3 wt. percent catalyst.

References Cited
UNITED STATES PATENTS 3,116,169   12/1963   Thompson _____ 136—120

WINSTON A. DOUGLAS, *Primary Examiner.*

A. SKAPARS, *Assistant Examiner.*